United States Patent
Shibata et al.

(10) Patent No.: US 6,356,303 B1
(45) Date of Patent: Mar. 12, 2002

(54) CAMERA CONTROL SYSTEM WITH ZOOM LENS CONTROL BASED ON TRANSMISSION TIME

(75) Inventors: Masahiro Shibata, Tokyo; Yoshihiro Ishida, Kawasaki; Masakazu Fujiki, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/013,316

(22) Filed: Jan. 26, 1998

(30) Foreign Application Priority Data

Feb. 5, 1997 (JP) .............................................. 9-022610

(51) Int. Cl.[7] .............................................. H04N 5/232
(52) U.S. Cl. ...................................... 348/211; 348/358
(58) Field of Search .............................. 348/207, 211, 348/212, 213, 358, 143, 169, 15, 16, 17, 369; H04N 5/232

(56) References Cited

U.S. PATENT DOCUMENTS 5,420,632 A  * 5/1995  Yamagiwa ................... 348/240
5,598,209 A  * 1/1997  Cortjens et al. ............. 348/211
6,108,035 A  * 8/2000  Parker et al. ................ 348/169

* cited by examiner

*Primary Examiner*—Tuan Ho
(74) *Attorney, Agent, or Firm*—Robin, Blecker & Daley

(57) ABSTRACT

A camera control device is arranged to recognize a relation between a desired state of a camera based on a camera control instruction issued and a current state of the camera, to calculate at least a transmission time required for transmission of information between the camera and the camera control device, and to form a camera control command on the basis of at least the calculated transmission time and the relation between the desired state of the camera and the current state of the camera.

14 Claims, 13 Drawing Sheets

CAMERA CONTROL SYSTEM WITH ZOOM LENS CONTROL BASED ON TRANSMISSION TIME

BACKGROUND OF THE INVENTION

1. Field of the Invention

The present invention relates to a camera control system and a camera control method suited for use in a surveillance camera, a video conference system or the like arranged to communicate information, for example, through a network.

2. Description of Related Art

Control systems have heretofore been developed for controlling the image pickup module of a camera, such as control over zooming, focusing and exposure actions of the camera, from a computer or the like via a communication medium, such as RS-232C or the like. Meanwhile, there has been proposed a camera control system in which to such a computer (hereinafter referred to as a camera server) is connected via a network an external control terminal for causing the camera server to execute a command for control over the image pickup module of the camera.

In the conventional camera control system, however, the camera server has been unable to smoothly control the zooming of the camera to obtain a desired zoom magnification, because of a delay of transmission of information due to a length of time required for communication by the RS-232C or a network, or the like.

This problem results from the zooming control arrangement of the camera including instructions only for moving and stopping a zoom lens and reading a pulse value of a zoom motor (or a stepping motor) in response to commands from the control terminal (or the camera server). The camera is not arranged to give any internal command for directly setting a pulse value of the zoom lens on the basis of a command coming from outside, i.e., from the control terminal or the camera server and for moving the zoom lens to a position corresponding to the set pulse value. Incidentally, in many cases, the zoom lens is arranged to be driven by a motor and the position of the zoom lens is controlled by using a pulse value of the motor, which is a value indicating the position of the zoom lens determined with a position corresponding to a zero pulse value of the motor used as a reference position.

More specifically, in a case where the zoom magnification of the camera is to be controlled to a desired magnification only by sending instructions from the camera server to the camera for moving and stopping a zoom lens and reading pulse values, the position of the zoom lens is read after the zoom lens is moved and information on the position of the zoom lens is sent to the camera server. The camera server then determines arrival of the zoom lens at a desired (or target) position and sends an instruction to the camera to stop moving the zoom lens according to the information on the zoom lens position received.

In the case of such a system, however, when the stopping instruction is sent to the camera with the target position determined to have been attained, the zoom action cannot be brought to a stop exactly where a desired zoom magnification is attained, because of a time lag which results from a communication delay over the network or the reaction (response) time of an image pickup module. Under such a condition, the zoom lens would be brought to a stop at a position deviating from a target pulse position.

BRIEF SUMMARY OF THE INVENTION

The invention is directed to the solution of the problem of the prior art described above. It is, therefore, an object of the invention to provide a camera control system which is capable of accurately controlling a camera to obtain a desired zoom magnification even with the simple construction of the camera.

To attain the above object, in accordance with an aspect of the invention, there is provided a camera control device for remotely controlling a camera having a zoom lens capable of varying a magnification thereof by varying a position thereof in an optical axis direction, which comprises issuing means for issuing a designated magnification of the zoom lens, recognition means for recognizing a relation between a position of the zoom lens based on the designated magnification of the zoom lens issued by the issuing means and a current position of the zoom lens, calculating means for calculating a transmission time required for transmission of information between the camera and the camera control device, and forming means for forming a control command for the zoom lens on the basis of the relation recognized by the recognition means between the position of the zoom lens based on the designated magnification of the zoom lens issued by the issuing means and the current position of the zoom lens and the transmission time calculated by the calculating means.

To attain the above object, in accordance with another aspect of the invention, there is provided a camera control system in which a camera connected to a camera server is controllable by a camera control device via a network, wherein the camera comprises a zoom lens capable of varying a magnification thereof by varying a position thereof in an optical axis direction, the camera control device comprises issuing means for issuing a designated magnification of the zoom lens, recognition means for recognizing a relation between a position of the zoom lens based on the designated magnification of the zoom lens issued by the issuing means and a current position of the zoom lens, calculating means for calculating a transmission time required for transmission of information between the camera and the camera control device, and forming means for forming a control command for the zoom lens on the basis of the relation recognized by the recognition means between the position of the zoom lens based on the designated magnification of the zoom lens issued by the issuing means and the current position of the zoom lens and the transmission time calculated by the calculating means, and the camera server comprises detection means for detecting the current position of the zoom lens, and transmission means for transmitting to the camera control device information on the current position of the zoom lens detected by the detection means.

To attain the above object, in accordance with a further aspect of the invention, there is provided a storage medium in which a control program is stored for controlling a camera control device which remotely controls a camera having a zoom lens capable of varying a magnification thereof by varying a position thereof in an optical axis direction, the control program causing the camera control device to issue a designated magnification of the zoom lens, to recognize a relation between a position of the zoom lens based on the designated magnification of the zoom lens issued and a current position of the zoom lens, to calculate a transmission time required for transmission of information between the camera and the camera control device, and to form a control command for the zoom lens on the basis of the relation between the position of the zoom lens based on the designated magnification of the zoom lens issued and the current position of the zoom lens and the transmission time calculated.

To attain the above object, in accordance with a still further aspect of the invention, there is provided a control method for a camera control device which remotely controls a camera having a zoom lens capable of varying a magnification thereof by varying a position thereof in an optical axis direction, the control method comprising an issuing step of issuing a designated magnification of the zoom lens, a recognition step of recognizing a relation between a position of the zoom lens based on the designated magnification of the zoom lens issued by the issuing step and a current position of the zoom lens, a calculating step of calculating a transmission time required for transmission of information between the camera and the camera control device, and a forming step of forming a control command for the zoom lens on the basis of the relation recognized by the recognition step between the position of the zoom lens based on the designated magnification of the zoom lens issued by the issuing step and the current position of the zoom lens and the transmission time calculated by the calculating step.

The above and other objects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

First Embodiment

Figure 1:
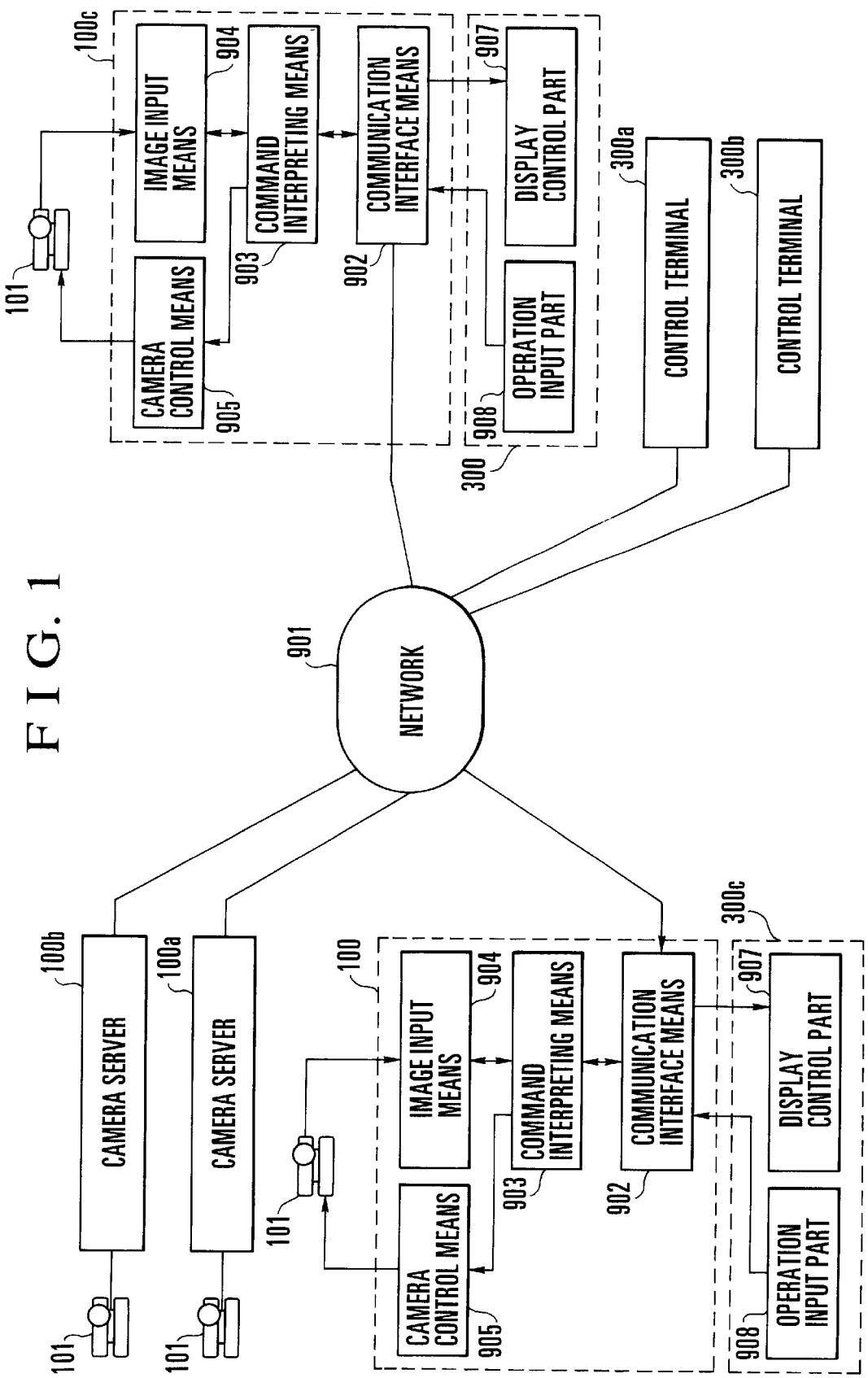
FIG. 1 is a schematic illustration of a camera control system according to each of embodiments of the invention.

FIG. 1 schematically shows the arrangement of a camera control system according to a first embodiment of the invention, which also applies to other embodiments of the invention.

The first embodiment is an embodiment suited to a case where an instruction for a zoom magnification of a camera is inputted directly to the camera from a camera server without being transmitted via a network, so that the camera server causes the camera to execute instructions for controlling or stopping the zoom operation of the camera, or a case where an instruction for a zoom magnification of a camera is received by a camera server from a control terminal via a network, so that the camera server causes the camera to execute instructions for controlling or stopping the zoom operation of the camera on the basis of the received instruction.

In FIG. 1, reference numeral 901 denotes a network, which may be LAN, WAN, the Internet or the like. In the case of the first embodiment, however, the camera control system is assumed to be connected to the Internet.

Reference numerals 300, 300a, 300b and 300c denote control terminals arranged to issue camera control instructions from remote places. Reference numeral 101 denotes a camera 101, the panning, tilting, zooming, etc., of which is externally controllable. Reference numerals 100, 100a, 100b and 100c denote camera servers, each of which is arranged to operate the camera 101 connected thereto according to a control command coming from the control terminal which has a right to control the camera 101, and to send to the control terminal an input image signal received from the camera 101.

In the first embodiment, each of the camera servers 100, 100a, 100b and 100c and each of the control terminals 300, 300a, 300b and 300c may be connected to the network 901 either separately or in a state obtained by unifying each camera server with the corresponding control terminal. In the latter case, each pair of the camera server and the control terminal can communicate with another pair in such a way as to operate the camera 101 of the other pair through the network 901. In that instance, each pair of the camera server and the control terminal of course can operate their own camera 101.

In the case of the first embodiment, the camera control system permits numerous camera servers and control terminals to be interconnected through the network. It is of course also possible to connect only one pair of the camera server and the control terminal to the network.

Each of the camera servers connected to the WWW (World Wide Web) system on the Internet functions as a WWW server, while a software of the WWW browser is included in a part of the control terminal. The camera server and the control terminal are thus arranged to intercommunicate, for example, through HTTP (hyper text transfer protocol) or the like.

In the WWW system, the camera server gains access either directly to or through a gateway to a server using some other protocol. The result of access is displayed for the user in the form of a hypertext. In other words, the WWW browser requests the WWW server, which is arranged to store document data and image data, to provide information according to a storage destination of desired data indicated by a URL (uniform resource locator). In response to the request, the WWW server sends the requested document data or image data to the WWW browser.

In the camera server 100, a communication interface means 902 is arranged to do exchange of signals between the camera server and the control terminal via the network 901. A command interpreting means 903 is arranged to interpret a signal received and to transmit a prescribed operating signal for the camera. An image input means 904 is arranged to receive an image from the camera and to carry out a signal processing action. A camera control means 905 is arranged to control the panning, tilting and zooming actions of the camera.

In the control terminal 300, a display control part 907 is arranged to display an image received from the camera server accessed and also a state of control over the camera 101. An operation input part 908 is arranged to request the camera server accessed to give a camera control right, to give an instruction for a change in the panning or tilting action of the camera 101 and to input setting values of parameters of the camera 101.

Further, with the camera control system arranged in the above manner, a plurality of cameras may be connected to the camera server 100.

Figure 2:
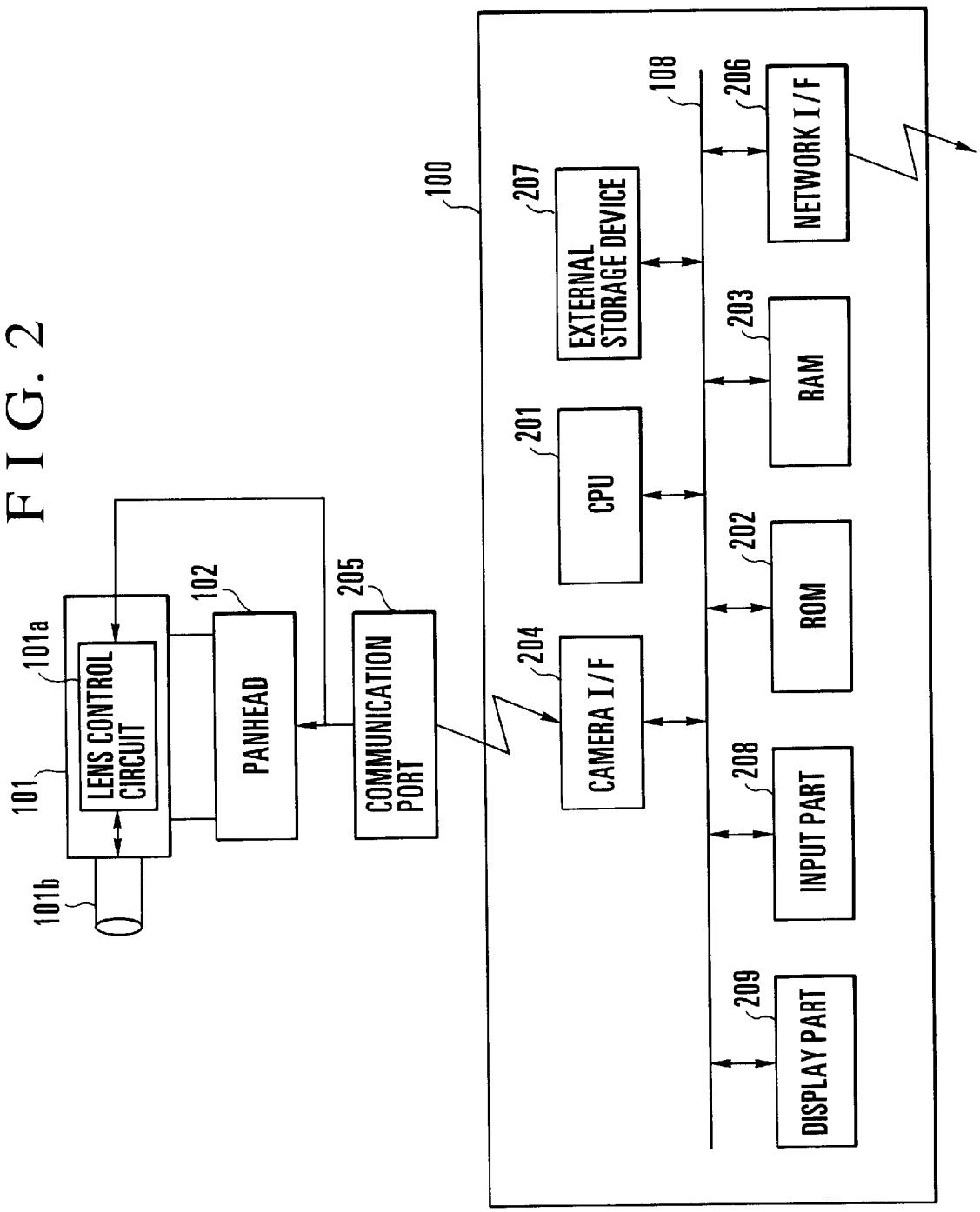
FIG. 2 is a block diagram showing the arrangement of each of camera servers shown in FIG. 1.

FIG. 2 is a block diagram showing in detail the arrangement of the camera server 100. In FIG. 2, reference numeral 201 denotes a CPU, which is arranged to perform overall control of various kinds in the camera server 100. A ROM 202 is arranged to store control programs of various kinds to be carried out by the CPU 201. A RAM 203 is arranged to provide the CPU 201 with working areas required in carrying out the control of various kinds. A bus 108 is arranged to connect the above-mentioned various component parts in such a way as to permit intercommunication among them.

A camera interface 204 is arranged to receive image signals from the camera 101 and to send camera control command signals to the camera 101. A communication port 205 is provided for transmission of information between the camera 101 and the camera server 100. A general-purpose serial interface such as RS-232C or a general-purpose parallel interface such as Centronics interface can be employed as the communication port 205. A network I/F (interface) 206 is provided for communication with other apparatuses existing on the network 901, such as control terminals, etc.

The camera 101 is provided with a lens control circuit 101a which is arranged to drive a zoom lens and a focusing lens of a lens unit 101b in accordance with instructions received from the camera server 100. With respect to the zoom lens, in particular, the lens control circuit 101a is arranged to cause the zoom lens to be moved and stopped, to read a pulse value relative to the current zoom lens position and to send the pulse value to the camera server 100.

Further, in the arrangement of the camera server 100 described above, the CPU 201 may be arranged to cause a camera server program stored in an external storage device 207 to be loaded on the RAM 203, and to carry out the camera server program thus-loaded.

In the camera server 100, an input part 208 is arranged to permit the user to input control instructions for varying the zoom magnification and for a panning or tilting action either on the camera 101 shown in FIG. 2 or on another camera 101 connected to the network through the network I/F 206. A display part 209 is composed of a monitor such as a CRT or an LCD, etc., and is arranged to be capable of displaying a picked-up image on the basis of an image signal coming either from the camera 101 which is shown in FIG. 2 or from another camera 101 which is connected to the network.

The input part 208 and the display part 209 are arranged to permit control over the camera and also to function as a control terminal which displays a picked-up image coming from the camera. The camera server 100 may be provided with these component parts as necessary.

In the arrangement of the camera server 100 shown in FIG. 2, the CPU 201 detects a current state of the camera, or a current pulse value of the zoom lens. The information on the current state of the camera is then transmitted from the CPU 201 and the network I/F 206 to the control terminal 300.

Figure 3:
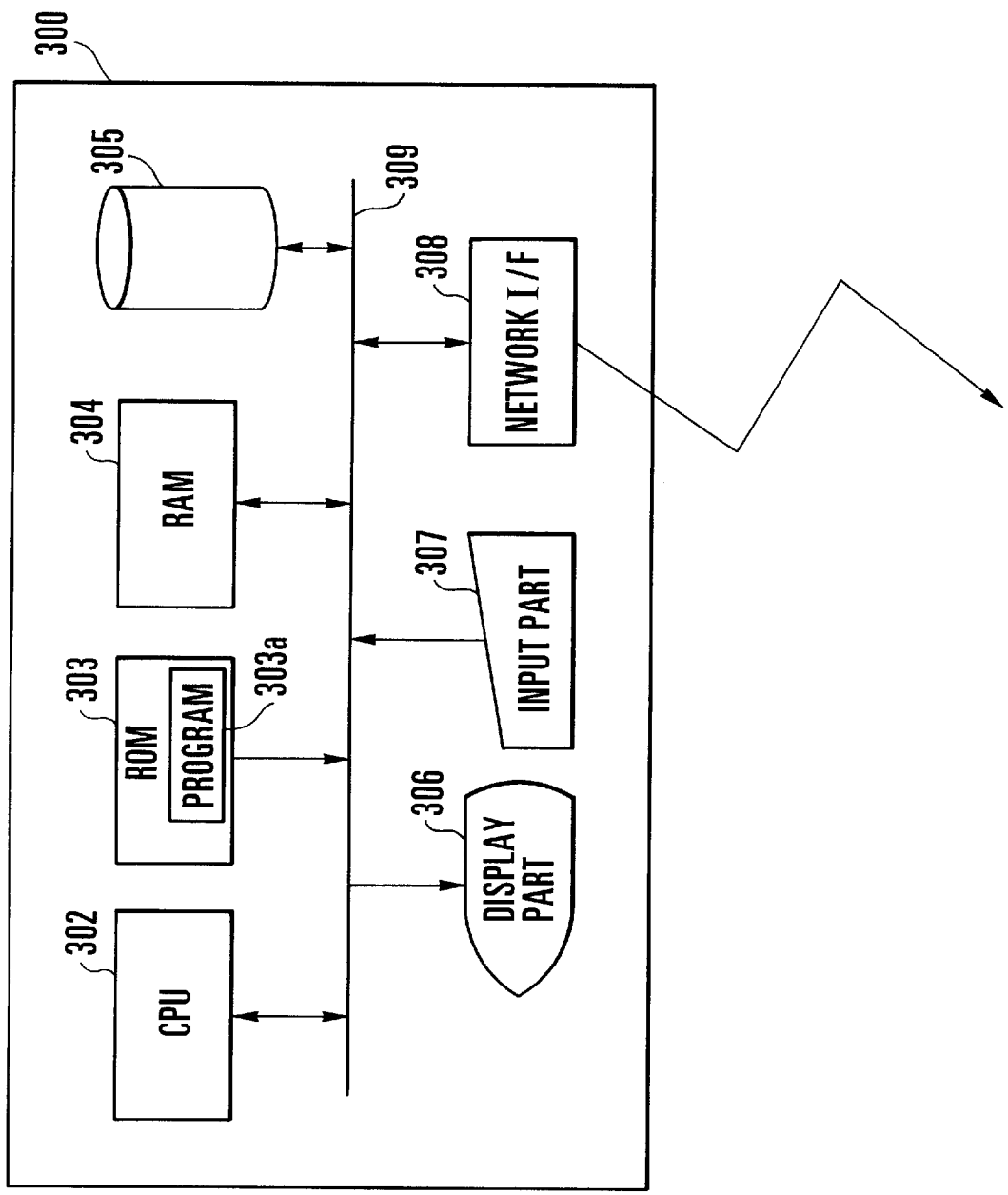
FIG. 3 is a block diagram showing the arrangement of each of control terminals shown in FIG. 1.

FIG. 3 is a block diagram showing in detail the arrangement of the control terminal 300, which controls the camera 101 connected to the camera server 100 through the network and displays an image inputted from the camera 101. Referring to FIG. 3, a CPU 302 is arranged to send to the camera server 100 control commands of various kinds for varying the posture and the zoom magnification of the camera 101 on the basis of a program 303a which is stored in a ROM 303. A RAM 304 is arranged to provide a working area for the CPU 302 in carrying out control of various kinds, with various setting programs, etc., which are stored in the ROM 303 down-loaded to the RAM 304.

Reference numeral 305 denotes an external storage device 305, which is arranged to store data of various kinds set by the user or a system manager. The external storage device 305 is composed of, for example, a magneto-optical disk (MO), a compact disk (CD-ROM), a hard disk, a floppy disk, or the like. An input part 307 is provided with a pointing device such as a mouse, a keyboard, etc., and is arranged to permit the user to input commands for control over the camera.

A network I/F (interface) 308 is arranged to enable the control terminal 300 to communicate through the network 901 with various apparatuses connected to the network. A bus 309 is arranged to permit the components of the control terminal 300 to communicate with each other. In the case of the first embodiment, camera operating signals set on the side of the control terminal 300 are sent to the camera server 100 (FIG. 2), and the control terminal 300 receives image signals produced by the camera 101 from the camera server 100.

A display part 306 is composed of a bit-map display, a CRT or an LCD and is arranged to display a picked-up image or to input a zoom magnification on its display image plane by using the input part 307.

Figure 4:
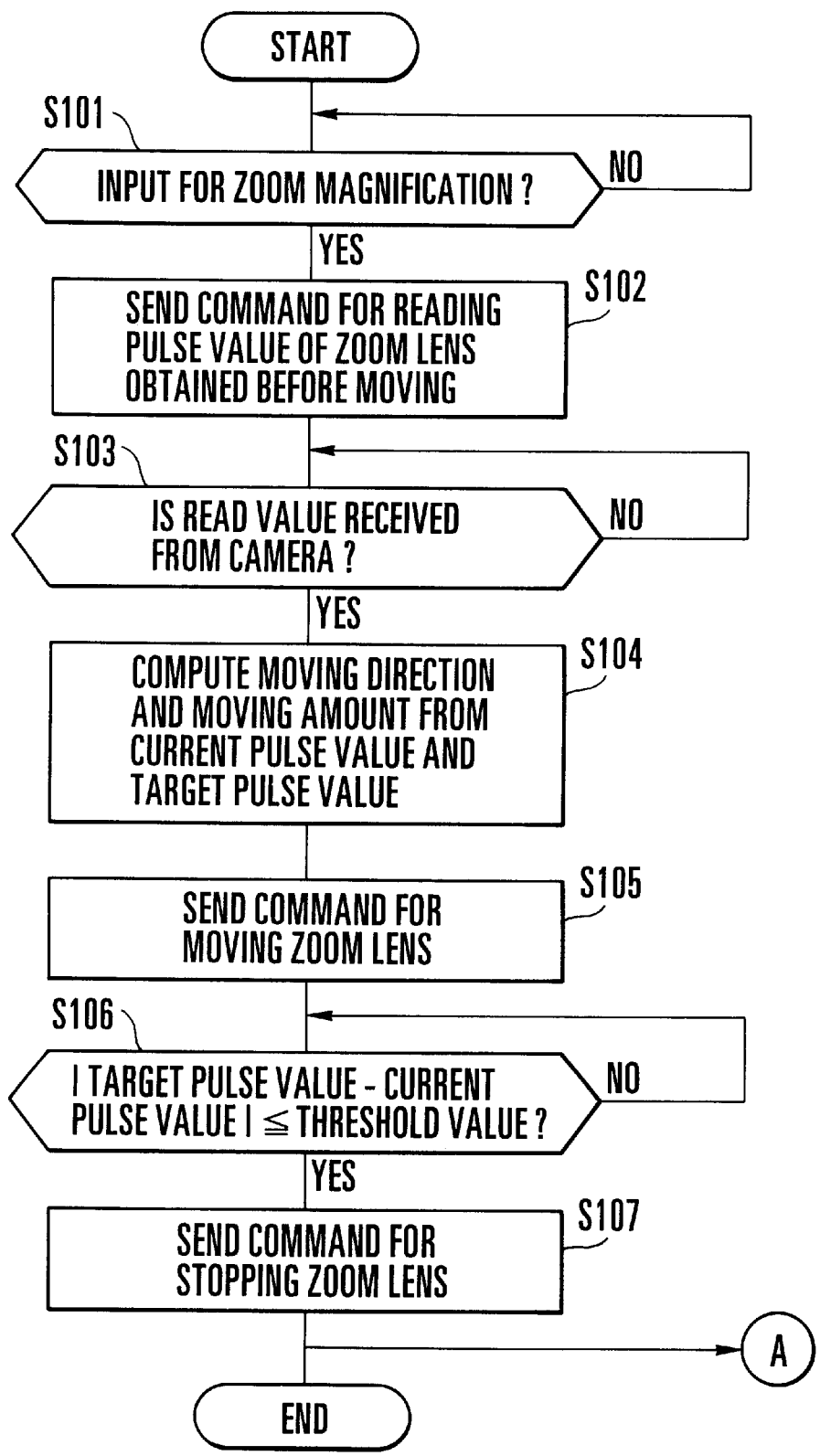
FIG. 4 is a flow chart showing the processes of operation of a camera server in a first embodiment of the invention.
Figure 5:
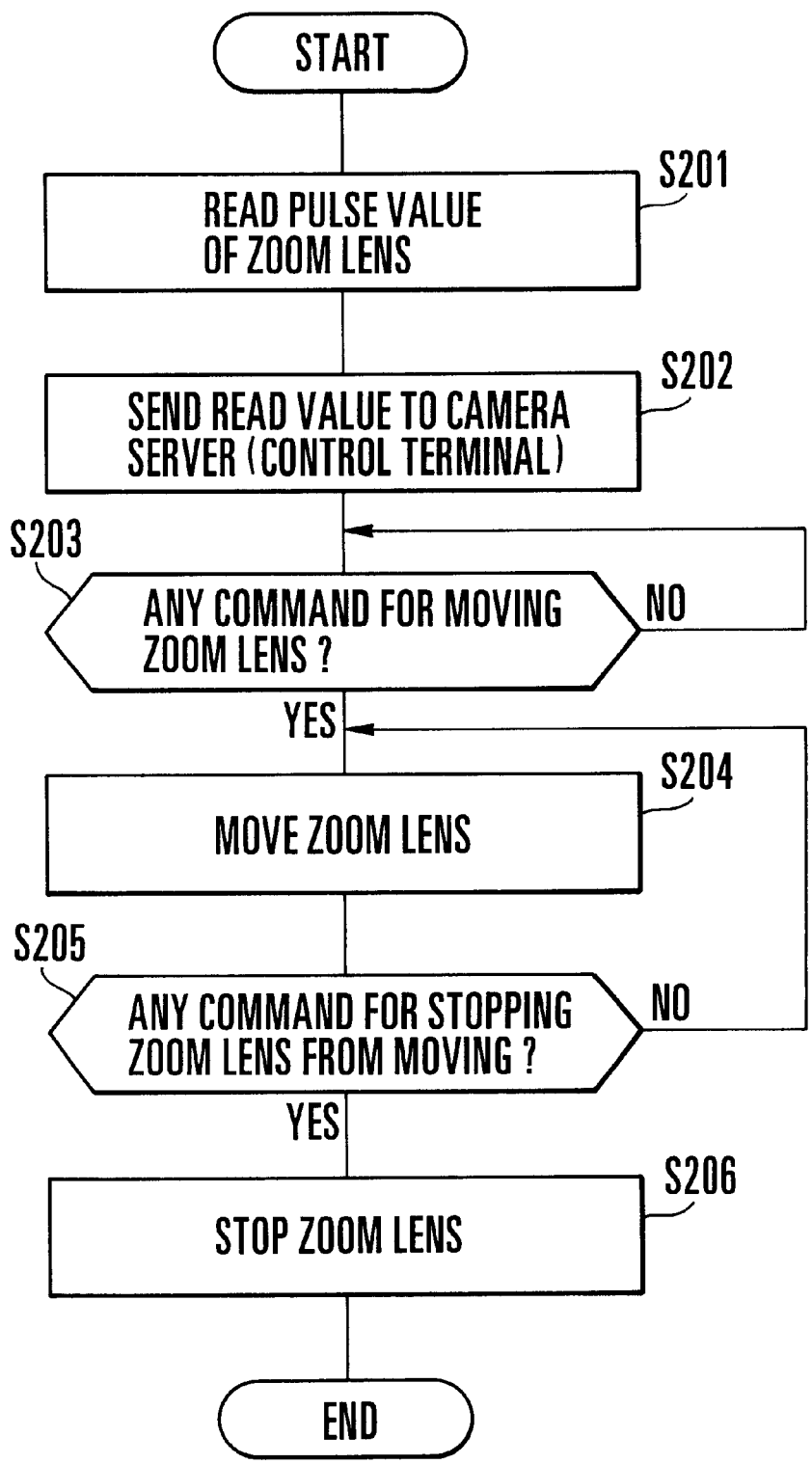
FIG. 5 is a flow chart showing the processes of operation of a camera in the first embodiment.

FIG. 4 is a flow chart showing the processes of operation of the camera server 100 to be performed when a command for control over the camera to obtain a desired zoom magnification is inputted at the control terminal 300 or the camera server 100. FIG. 5 is a flow chart showing the processes of operation of the camera 101 to be performed when the camera control command for the desired zoom magnification is transmitted from the camera server 100. A control operation of the first embodiment for control over the zoom magnification of the camera 101 is described below with reference to these flow charts. Here, in the first embodiment, a control instruction for the zoom magnification inputted at the camera server 100 is transmitted, not via the network 901, to the camera 101 which is directly connected to that camera server 100 through a general-purpose interface, so that the zoom operation of the camera 101 is controlled.

At a step S101 of FIG. 4, a check is made to find if a control command for a zoom magnification of the camera 101 which is under control is inputted by the user from the input part 307 or 208. If so, the flow of operation proceeds to a step S102. At the step S102, the CPU 201 of the camera server 100 first sends a command to the camera 101 to cause the camera 101 to read a pulse value which indicates the current position of the zoom lens before moving.

At this time, the zoom control command may be inputted by the user by inputting the numerical value of a desired magnification, for example, to designate "five" if the five magnifications are desired to be the zoom magnification.

At a step S201 of FIG. 5, upon receipt of the reading command for reading the pulse value of the zoom lens before moving, the camera 101 causes the lens control circuit 101a to read the pulse value of the zoom lens.

At the next step S202 of FIG. 5, after reading the pulse value of the zoom lens before moving, the lens control circuit 101a sends the read pulse value to the camera server 100 through the communication port 205 and, if necessary, the camera server 100 sends the read pulse value to the control terminal 300 from the network I/F 206.

Referring again to FIG. 4, at a step S103, a check is made to find if the (current) read pulse value of the zoom lens before moving is received. If so, the flow proceeds to a step S104. At the step S104, the CPU 201 compares the current pulse value of the zoom lens of the camera 101 with an issued target pulse value to decide the direction and the amount (a pulse amount) of moving the zoom lens. The moving direction of the zoom lens is decided by examining whether the zooming position issued (designated) is located on the telephoto side or on the wide-angle side of the current position of the zoom lens. The moving amount of the zoom lens is obtained by computing a difference between the above-stated pulse values.

At a step S105, a command to move the zoom lens is sent to the camera 101 according to the result of the above-stated computing process. Then, at the same time, the camera server 100 requests the camera 101 to send the current pulse value of the zoom lens so as to confirm the moving position of the zoom lens.

Referring again to FIG. 5, at a step S203, a check is made at the camera 101 to find if the command to move the zoom lens is received. If so, the flow proceeds to a step S204. At the step S204, the lens control circuit 101a controls and causes the zoom lens to move in accordance with the received command. While driving the zoom lens, the lens control circuit 101a constantly reads the pulse value of the zoom lens and sends the read pulse value to the camera server 100.

Here, a threshold value is obtained from a known time lag of communication via the communication port 205, a time lag of response from the camera 101, the moving speed of the zoom lens, etc., in the following manner.

A communication time lag in transmitting the current pulse value of the zoom lens from the camera 101 to the camera server 100 via the communication port 205 is assumed to be t1, and a communication time lag in transmitting information on the stopping control for the zoom lens from the camera server 100 to the camera 101 via the communication port 205 is assumed to be t2. Further, the moving speed (velocity) of the zoom lens is assumed to be V (pps: pulse per second). Incidentally, in the first embodiment, the processing time required for each of the camera 101 and the camera server 100 is very short and is, therefore, not taken into consideration.

Then, the number of pulses by which the zoom lens moves during a period from a time point at which the camera 101 sends out the current pulse value of the zoom lens until the camera 101 receives the control command transmitted from the camera server 100 immediately after the current pulse value of the moving zooming lens is received by the camera server 100, becomes "V×(t1+t2)".

The number of pulses (pulse value) obtained in accordance with the above expression is used as the threshold value in the first embodiment. Further, the communication time lags t1 to t2 are determined by the transmission capacity of the communication port 205.

Resuming now the description of the flow chart of FIG. 4, at a step S106, a difference between the current pulse value of the moving zoom lens sent from the camera 101 and the target pulse value is obtained, and a check is made to find if the difference between the current pulse value and the target pulse value is equal to or smaller than the threshold value. If the difference is found to be larger than the threshold value, the moving action of the zoom lens is allowed to continue. If the difference is found to be equal to or smaller than the threshold value, the flow proceeds to a step S107. At the step S107, the CPU 201 sends an instruction to the camera 101 to cause the camera 101 to stop moving the zoom lens.

At a step S205 of FIG. 5, when the instruction to stop the moving action of the zoom lens is received from the camera server 100, the lens control circuit 101a performs lens stopping control to bring the zoom lens to a stop (step S206).

As described above, the control operation of the camera control system is arranged according to the invention to be carried out with a delay of control over the zoom lens due to the control signal transmission time lag taken into consideration beforehand on the side of the camera server 100. Therefore, the zoom magnification can be adequately controlled from the camera server 100 or the control terminal 300 by just sending commands for moving and stopping the zoom lens and for reading the pulse value to the camera 101 disposed on the side of the camera server 100.

Second Embodiment

A camera control system according to the second embodiment of the invention is arranged such that, when the target position (a target pulse value) of the zoom lens and the current position (a current pulse value) of the zoom lens differ to a great extent from each other, the zoom lens is caused to be moved at a high speed at first and at a low speed when the current position of the zoom lens comes close to the target position. In the second embodiment, the whole system, the control terminal 300 and the camera server 100 are arranged in the same manner as in the case of the first embodiment and, therefore, the details of them are omitted from the following description of the second embodiment.

Figure 6:
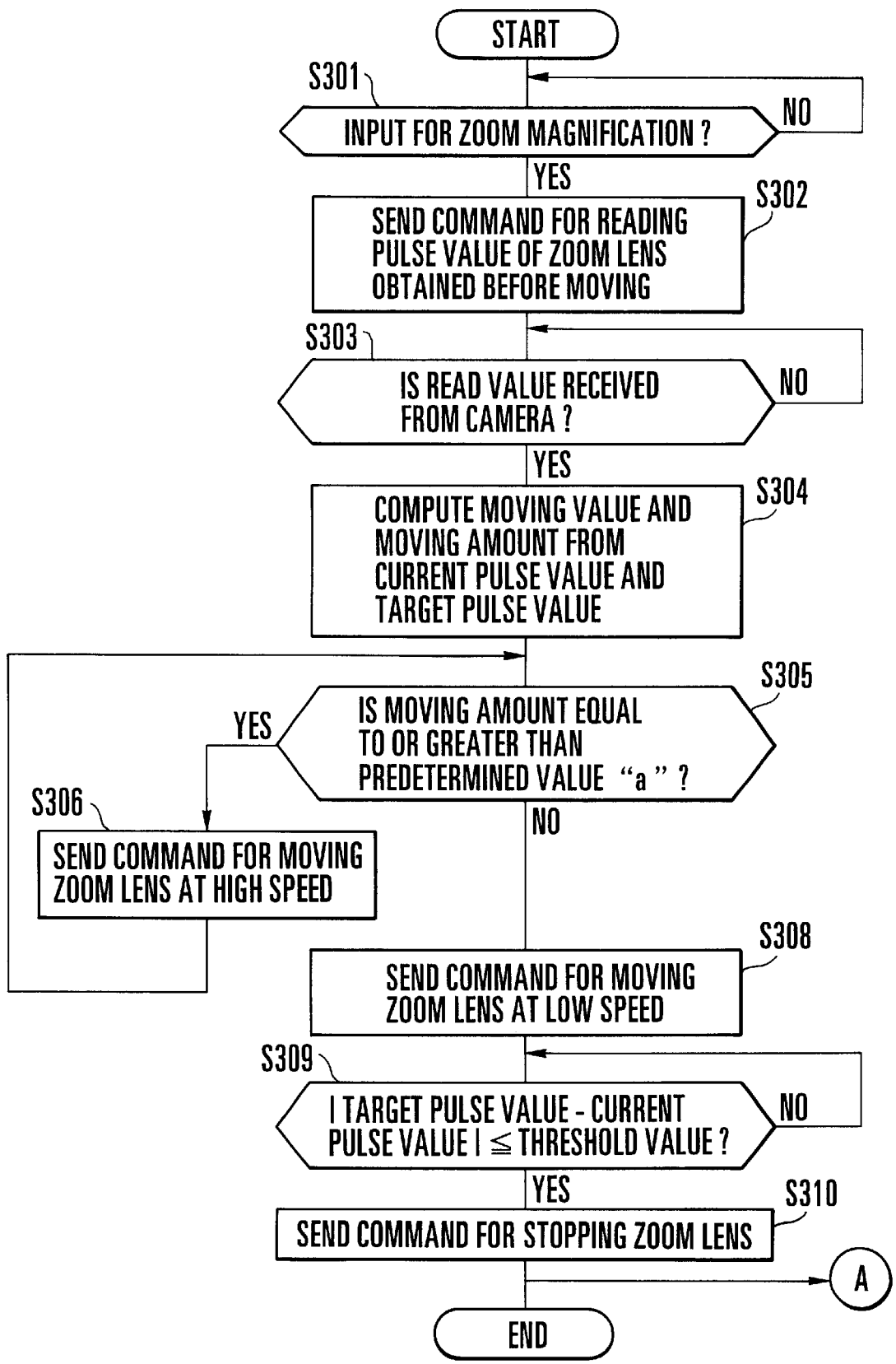
FIG. 6 is a flow chart showing the processes of operation of a camera server in a second embodiment of the invention.
Figure 7:
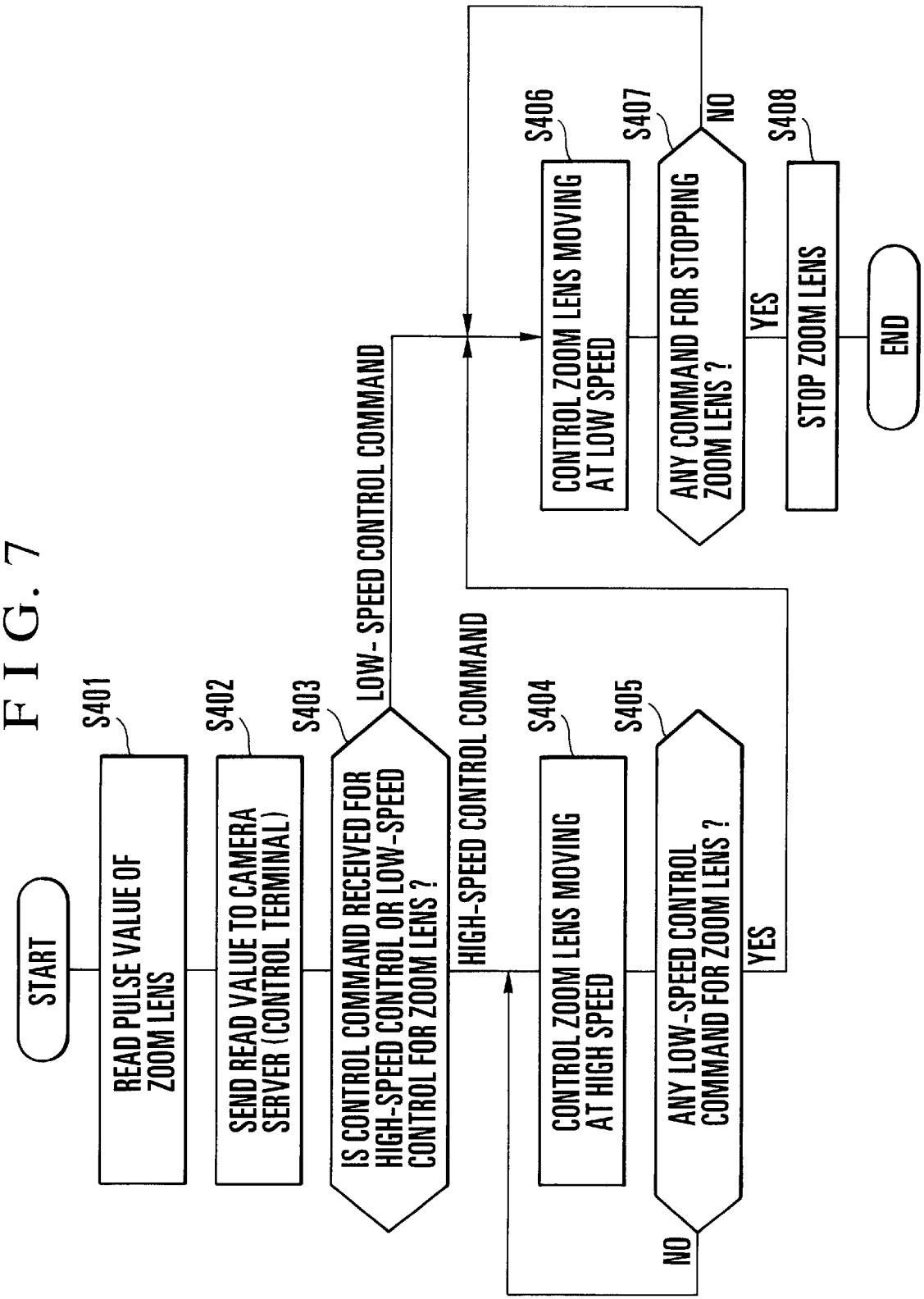
FIG. 7 is a flow chart showing the processes of operation of a camera in the second embodiment.

FIG. 6 is a flow chart showing the processes of operation of the camera server 100 in the second embodiment. FIG. 7 is a flow chart showing the processes of operation to be executed on the side of the camera 101. The control operation on the zoom lens of the camera 101 in the second embodiment is described below with reference to these flow charts.

In the second embodiment, the processes to be executed by the camera server 100 at steps S301 to S304 of FIG. 6 until the direction and the amount of moving the zoom lens are computed on the basis of the current pulse value and the target pulse value after the input of a zoom magnification are identical with those shown at the steps S101 to S104 in FIG. 4. The processes to be executed by the camera 101 at steps S401 and S402 of FIG. 7 are identical with those shown at the steps S201 and S202 in FIG. 5. Therefore, these parts of operation are omitted from the following description.

At a step S305 of FIG. 6, with the direction and the amount of moving the zoom lens computed by the CPU 201, a check is made to find if the computed moving amount (a pulse value or amount) is equal to or greater than a predetermined value "a", which is greater than the threshold value. If so, the position of the zoom lens is judged to be away from the target position of the zoom lens, and the flow proceeds to a step S306. At the step S306, the CPU 201 sends a control command to the lens control circuit 101a to move the zoom lens at a high speed.

Then, at a step S403 of FIG. 7, the lens control circuit 101a of the camera 101 checks the control command received from the camera server 100 to find whether it is for moving the zoom lens at a high speed or at a low speed. Since the command is for moving the zoom lens at a high speed, in this instance, the flow of operation proceeds to a step S404. At the step S404, the lens control circuit 101a of the camera 101 causes the zoom lens to move at a high speed.

The camera server 100 in the second embodiment is also arranged to keep on reading the current pul se value of the zoom lens sent from the camera 101, like that of the first embodiment. When the difference between the current pulse value and the target pulse value is found at the step S305 to be less than the predetermined value "a" after the high-speed control command is sent, the flow of operation proceeds to a step S308. At the step S308, the CPU 201 sends a low-speed control command to the lens control circuit 101a to cause the zoom lens to move at a low speed.

When the camera 101 receives the low-speed control command at a step S405 of FIG. 7, the flow of operation then proceeds to a step S406. At the step S406, the camera 101 then sends a command to the lens control circuit 101a to control and move the zoom lens at a low speed.

Further, at the step S305 of FIG. 6, when the CPU 201 finds that the moving amount (pulse value) of the zoom lens before driving is less than the predetermined value "a", the flow proceeds to the step S308 to send, to the camera 101, the command for moving the zoom lens at a low speed. The zoom lens is then controlled and moved at a low speed at the step S406 of FIG. 7.

At a step S309 of FIG. 6, the current pulse value indicating the current position of the moving zoom lens is compared with the target pulse value. A check is made to find if the difference thus obtained is equal to or less than the threshold value which has been described above in the description of the first embodiment. If the difference between the current pulse value and the target pulse value is greater than the threshold value, the moving action of the zoom lens, i.e., zooming, is allowed to continue. If the difference between the current pulse value and the target pulse value is equal to or less than the threshold value, the flow of operation proceeds to a step S310. At the step S310, the CPU 201 sends an instruction to the camera 101 to stop moving the zoom lens.

At a step S407 of FIG. 7, a check is made for receipt of the command for stopping the moving action of the zoom lens. When this command is received from the camera server 100, the camera 101 causes the lens control circuit 101a to control and bring the zoom lens to a stop (step S408).

As described above, the camera control system according to the second embodiment of the invention is arranged to cause the zoom lens to move at a high speed when the current position of the zoom lens is far away from the target position and at a low speed when the zoom lens comes close to the target position. According to the arrangement, therefore, the zoom lens can be more speedily and more accurately brought to a stop at the target position.

Third Embodiment

Figure 8:
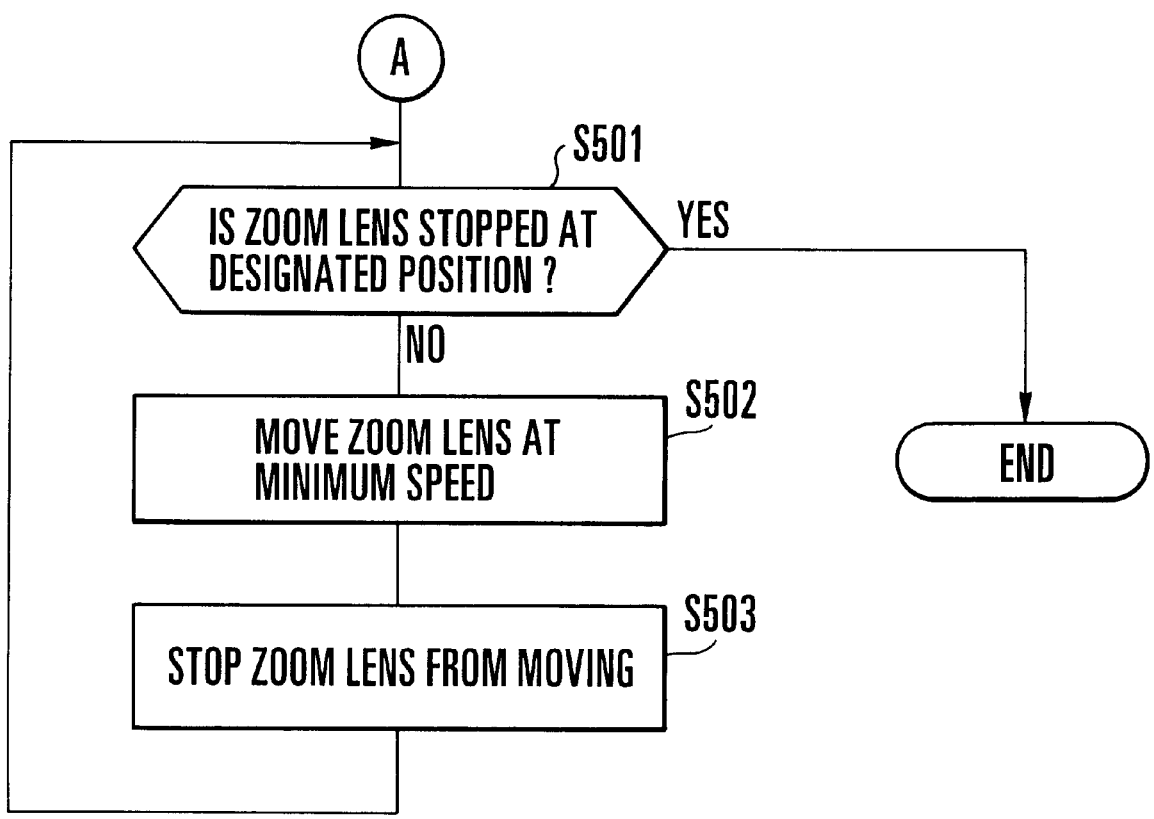
FIG. 8 is a flow chart showing the processes of operation of a camera server in a third embodiment of the invention.

A camera control system according to the third embodiment of the invention is arranged also in the same manner as the first embodiment but differs in operation from the first and second embodiments. In the third embodiment, after the processes of operation are carried out to bring the zoom lens to a stop, in the same manner as in the first and second embodiments, at a point of time A indicated in FIG. 4 or FIG. 6, the position of the zoom lens is finely adjusted. FIG. 8 is a flow chart showing a flow of processes of operation to be executed by the camera server 100 after the above-stated point of time A. The third embodiment is described below with reference to FIG. 8.

At a step S501 of FIG. 8, information on a pulse value obtained after the zoom lens is brought to a stop is received from the camera 101, and a check is made to find if that pulse value coincides with the target pulse value thus indicating that the zoom lens is stopped in a designated position. If so, the flow of operation proceeds to an end.

If the pulse value obtained after the zoom lens is brought to a stop is found to deviate from the target pulse value, the flow proceeds to a step S502. At the step S502, a control command is sent to the camera 101 to cause the zoom lens to move at the minimum speed in the direction of bringing the pulse value to the target pulse value. At the next step S503, a control command is sent to the camera 101 to stop the zoom lens from moving after the lapse of a prescribed (very short) period of time. These steps are repeated to adjust the deviation by sending the control commands to the camera 101 until the zoom lens reaches the target position.

In the event of a discrepancy between the pulse value obtained after the zoom lens is stopped and the target pulse value, the execution of the adjusting steps enables the third embodiment to accurately bring the zoom lens to a stop at the target position without fail.

In the first, second and third embodiments of the invention described above, information on an arbitrary zoom magnification inputted at the control terminal 300 is transmitted as it is to the camera server 100, or the information on the zoom magnification is directly inputted at the camera server 100 without using the network 901, so as to control the camera 101.

In the case of each of fourth, fifth and sixth embodiments of the invention which will be described hereinafter, while a camera control system is arranged in the same manner as in the first embodiment, the control terminal 300 is arranged to operate such that, when an arbitrary zoom magnification is inputted, the control terminal 300 sends instructions to the camera server 100 only for control over the zooming action and for bringing the zooming action to a stop. After receipt of these instructions, the camera server 100 operates to send the zooming control or zooming stopping instruction received from the control terminal 300 to the camera 101.

Fourth Embodiment

The entire arrangement of the camera control system in the fourth embodiment is the same as in the first embodiment, and the details thereof are, therefore, omitted from the following description.

Figure 9:
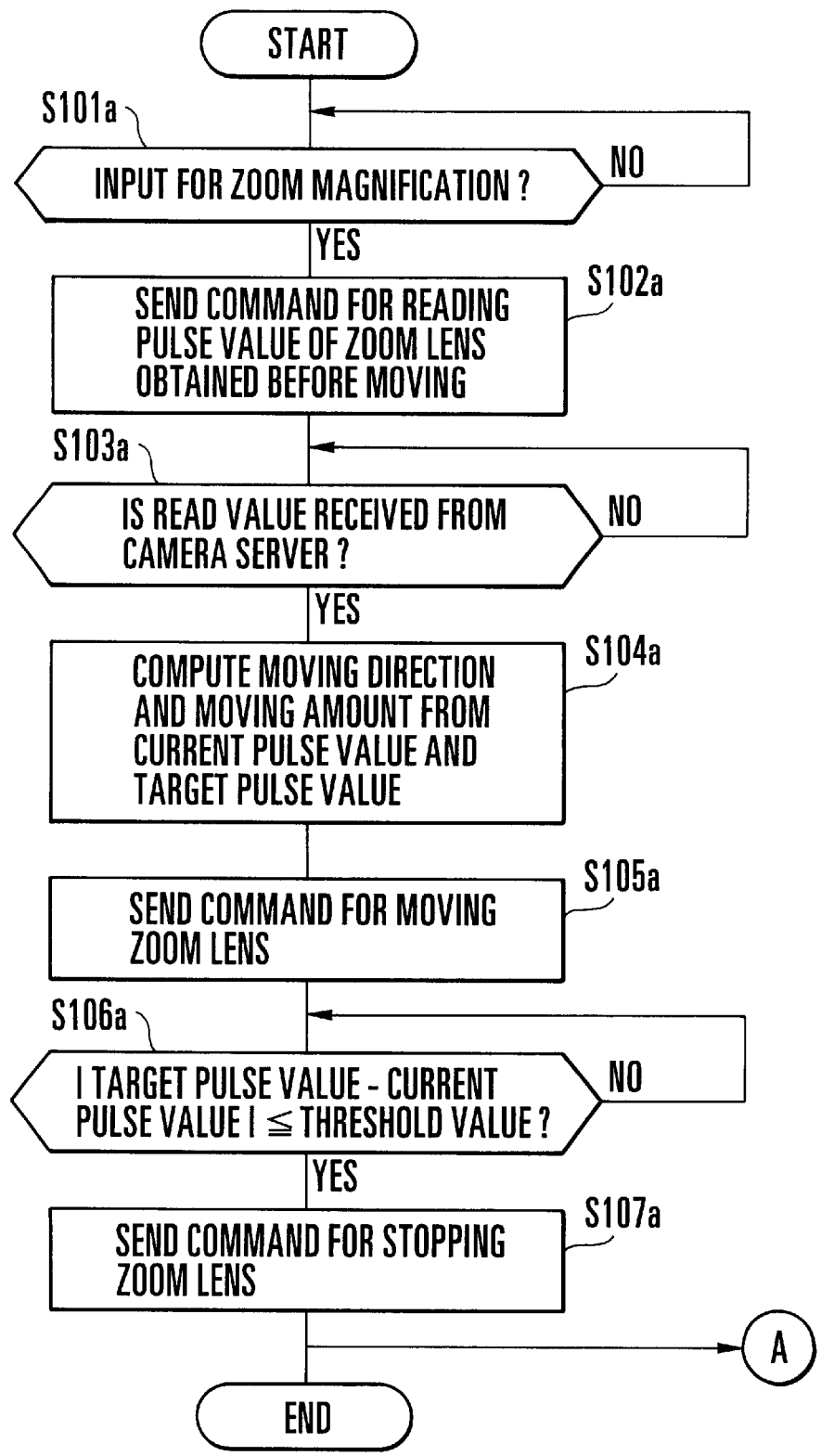
FIG. 9 is a flow chart showing the processes of operation of a control terminal in a fourth embodiment of the invention.
Figure 10:
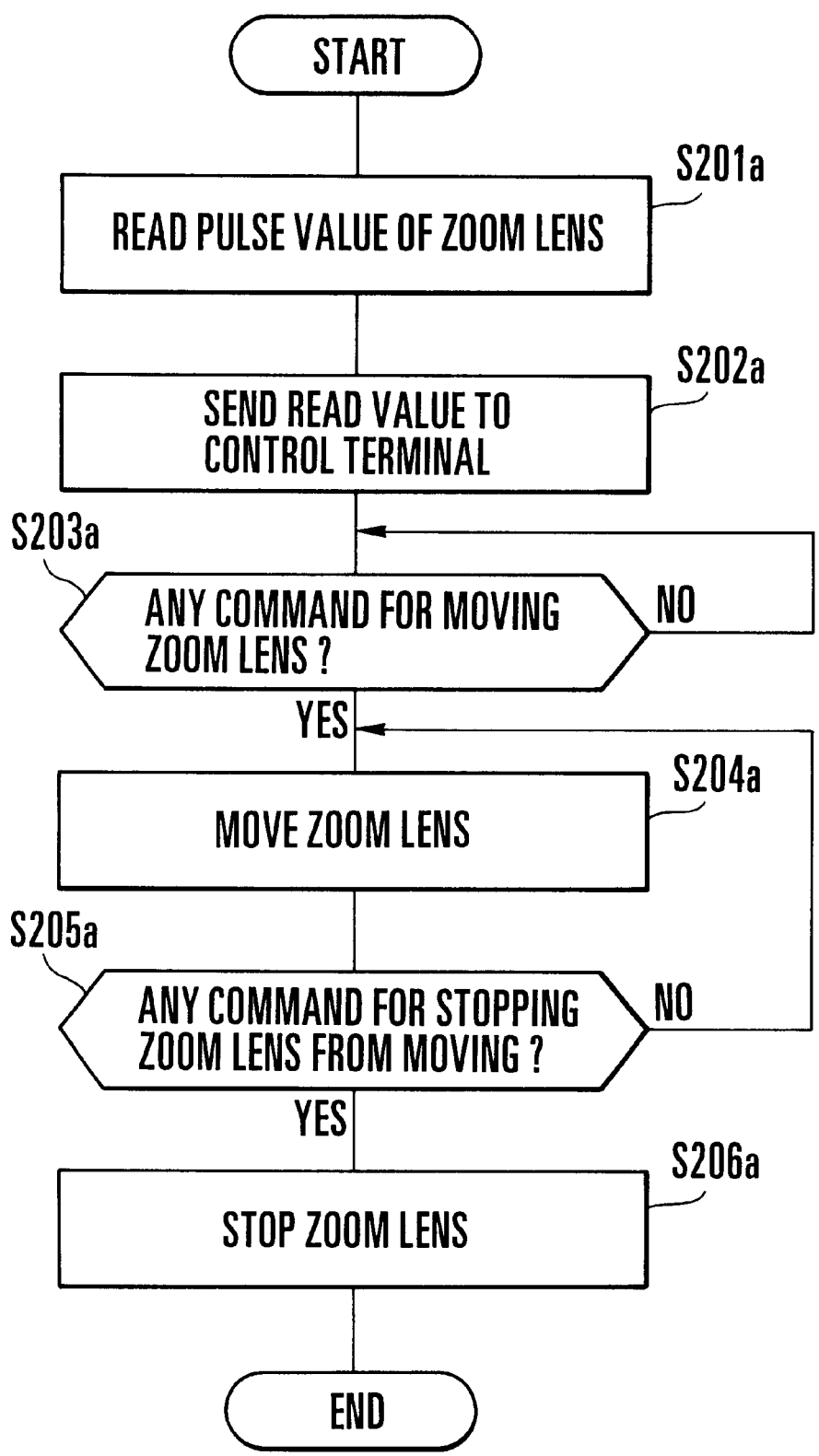
FIG. 10 is a flow chart showing the processes of operation of a camera server in the fourth embodiment.

FIG. 9 is a flow chart showing the processes of operation to be carried out on the side of the control terminal 300 in the fourth embodiment when a camera control command for an arbitrary zoom magnification is inputted at the control terminal 300. FIG. 10 is a flow chart showing the processes of operation to be carried out on the side of the camera server 100 when a camera control command for an arbitrary zoom magnification is transmitted from the control terminal 300. In the fourth embodiment, the zoom magnification of the camera 101 is controlled in a manner as described below with reference to these flow charts.

At a step S101a of FIG. 9, a check is made to find if a control command for a zoom magnification of the camera 101 under control is inputted by the user at the input part 307 of the control terminal 300. When the command is inputted, the flow of operation proceeds to a step S102a. At the step S102a, the CPU 302 at first sends to the camera server 100 a command for reading a pulse value obtained before moving the zoom lens of the camera 101.

At a step S201a of FIG. 10, when the camera server 100 receives from the control terminal 300 the command for reading the pulse value before moving the zoom lens, the CPU 201 then sends an inquiring signal (a request) for the pulse value of the zoom lens to the lens control circuit 101a disposed within the camera 101. At a step S202a, when the pulse value before moving the zoom lens is read from the lens control circuit 101a the CPU 201 sends information on the read pulse value to the control terminal 300.

At a step S103a of FIG. 9, when the information on the read pulse value before moving the zoom lens, i.e., the current pulse value of the zoom lens, is received from the camera server 100, the flow proceeds to a step S104a. At the step S104a, the CPU 302 compares the current pulse value of the zoom lens with a target pulse value issued so as to obtain the direction and an amount (a pulse amount) of moving the zoom lens. The moving direction of the zoom lens is decided by finding whether the issued (designated or target) position of the zoom lens is on the telephoto side or on the wide-angle side of the current position of the zoom lens. The moving amount of the zoom lens is decided by computing a difference between the two pulse values.

At a step S105a, a command to move the zoom lens is sent out on the basis of the result of the above computation. At the same time, the control terminal 300 requests the camera server 100 to send a current pulse value of the zoom lens so as to confirm the moving position of the zoom lens.

At a step S203a of FIG. 10, a check is made for the moving command for the zoom lens from the control terminal 300. When this command is received, the flow proceeds to a step S204a. At the step S204a, the CPU 201 constantly reads the pulse value of the zoom lens from the lens control circuit 101a and keeps on sending the read pulse values to the control terminal 300 while the zoom lens is being driven.

Incidentally, in the fourth embodiment, the response processing time required for each of the camera 101, the camera server 100 and the control terminal 300 is very short, and is, therefore, not taken into consideration.

Referring again to the flow chart of FIG. 9, the control terminal 300 decides a threshold value when a right to control the camera 101 on the network 901 is acquired. The threshold value is obtained from a known time lag of communication via the communication port 205, a time lag of response from the camera 101, a time lag of signal transmission of the network 901, the moving speed of the zoom lens, etc., in the following manner.

A communication time lag in transmitting the current pulse value of the zoom lens from the camera 101 to the camera server 100 via the communication port 205 is assumed to be t1, a communication time lag in transmitting the current pulse value of the zoom lens from the camera server 100 to the control terminal 300 via the network 901 is assumed to be t2, a communication time lag in transmitting an instruction for stopping the zoom lens from the control terminal 300 to the camera server 100 via the network 901 is assumed to be t3, and a communication time lag in transmitting information on the stopping control for the zoom lens from the camera server 100 to the camera 101 via the communication port 205 is assumed to be t4. Further, the moving speed (velocity) of the zoom lens is assumed to be V (pps: pulse per second).

Then, the number of pulses by which the zoom lens moves during a period from a time point at which the camera 101 sends out the current pulse value of the zoom lens until the camera 101 receives the control command transmitted from the control terminal 300 immediately after the current pulse value of the moving zooming lens is received by the control terminal 300, becomes "V×(t1+t2+t3+t4)".

The number of pulses (pulse value) obtained in accordance with the above expression is used as the threshold value in the fourth embodiment. Further, the communication time lags t1 to t4 are determined by the transmission capacity of the communication port 205, that of the network 901, etc. When the right to control the camera is acquired by the control terminal 300, therefore, the camera server 100 which grants the camera control right provides the control terminal 300 with information relative to the communication time lags, including the transmission capacity of the communication port 205 and that of the network 901. When this information is provided, the CPU 302 calculates the threshold value. By this arrangement, the threshold value can be correctly computed even when the communication port 205 is arranged to have a different transmission capacity on the side of the camera server 100.

Further, the threshold value may be prestored either in the external storage device 305 or in the RAM 304 depending on the arrangement of the camera server 100. Such an arrangement obviates the necessity of obtaining the information such as the transmission capacity of the communication port 205 and that of the network 901, so that a length of time required for the processes of operation can be shortened.

Referring again to the flow chart of FIG. 9, at a step S106a, a difference between the current pulse value of the moving zoom lens sent from the camera server 100 and the target pulse value is obtained, and a check is made to find if the difference between the current pulse value and the target pulse value is equal to or smaller than the threshold value. If the difference is found to be larger than the threshold value, the moving action of the zoom lens is allowed to continue. If the difference is found to be equal to or smaller than the threshold value, the flow proceeds to a step S107a. At the step S107a, the CPU 302 sends an instruction to the camera server 100 to stop the moving action of the zoom lens.

At a step S205a of FIG. 10, when the instruction for stopping the moving action of the zoom lens is received from the control terminal 300, the CPU 201 causes the lens control circuit 101a to perform the lens stopping control to bring the zoom lens to a stop (step S206a).

As described above, the control operation of the camera control system is arranged according to the invention to be carried out with a delay of control over the zoom lens due to the control signal transmission time lag taken into consideration beforehand on the side of the control terminal 300. Therefore, the zoom magnification can be adequately controlled from the control terminal 300 by just sending commands for moving and stopping the zoom lens and for reading the pulse value to the camera 101 disposed on the side of the camera server 100.

Fifth Embodiment

A camera control system according to the fifth embodiment of the invention is arranged such that, when the target position (a target pulse value) of the zoom lens and the current position (a current pulse value) of the zoom lens differ to a great extent from each other, the zoom lens is caused to be moved at a high speed at first and at a low speed when the current position of the zoom lens comes close to the target position. In the fifth embodiment, the whole system, the control terminal 300 and the camera server 100 are arranged in the same manner as in the case of the first embodiment and, therefore, the details of them are omitted from the following description of the fifth embodiment.

Figure 11:
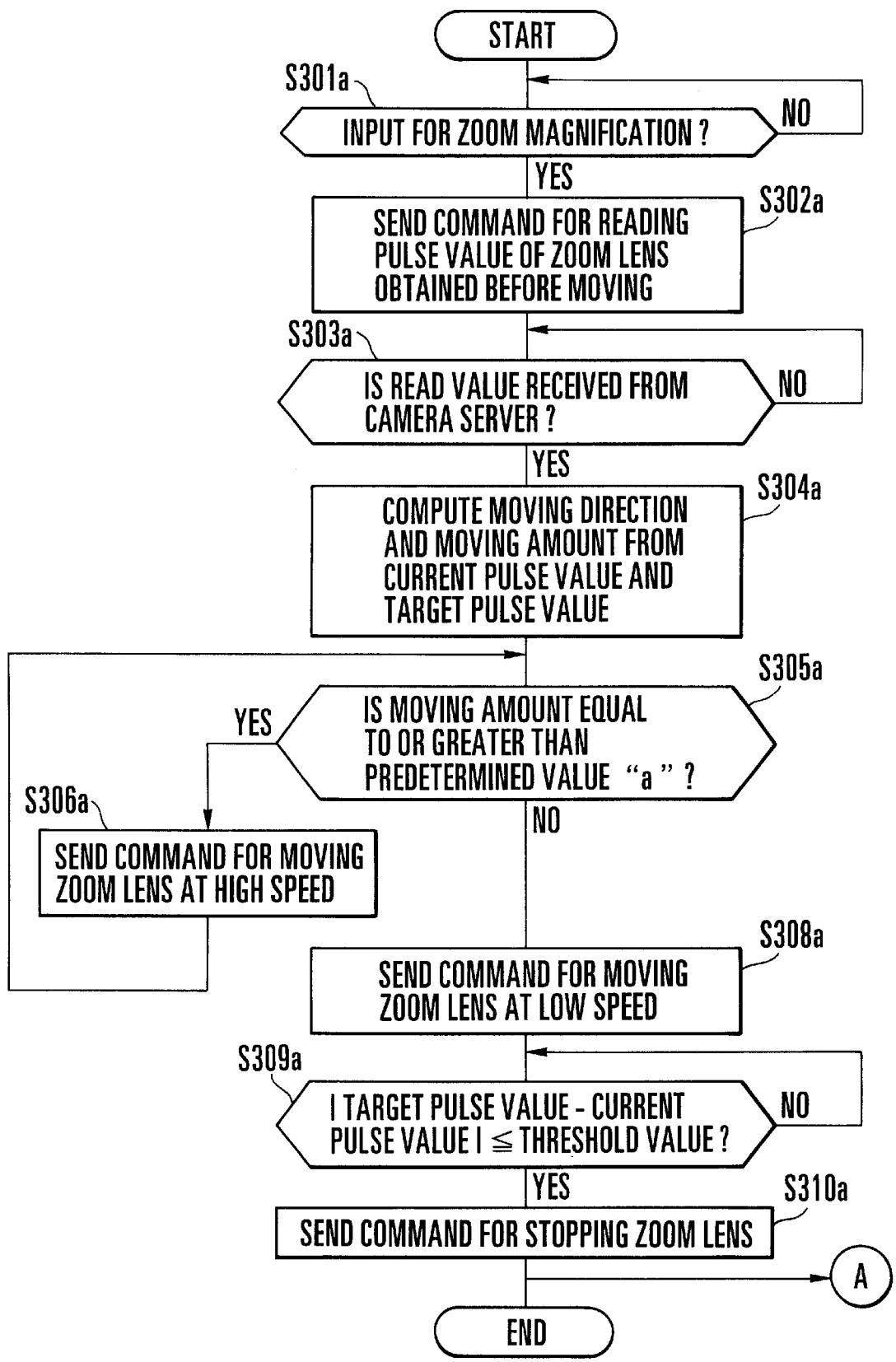
FIG. 11 is a flow chart showing the processes of operation of a control terminal in a fifth embodiment of the invention.
Figure 12:
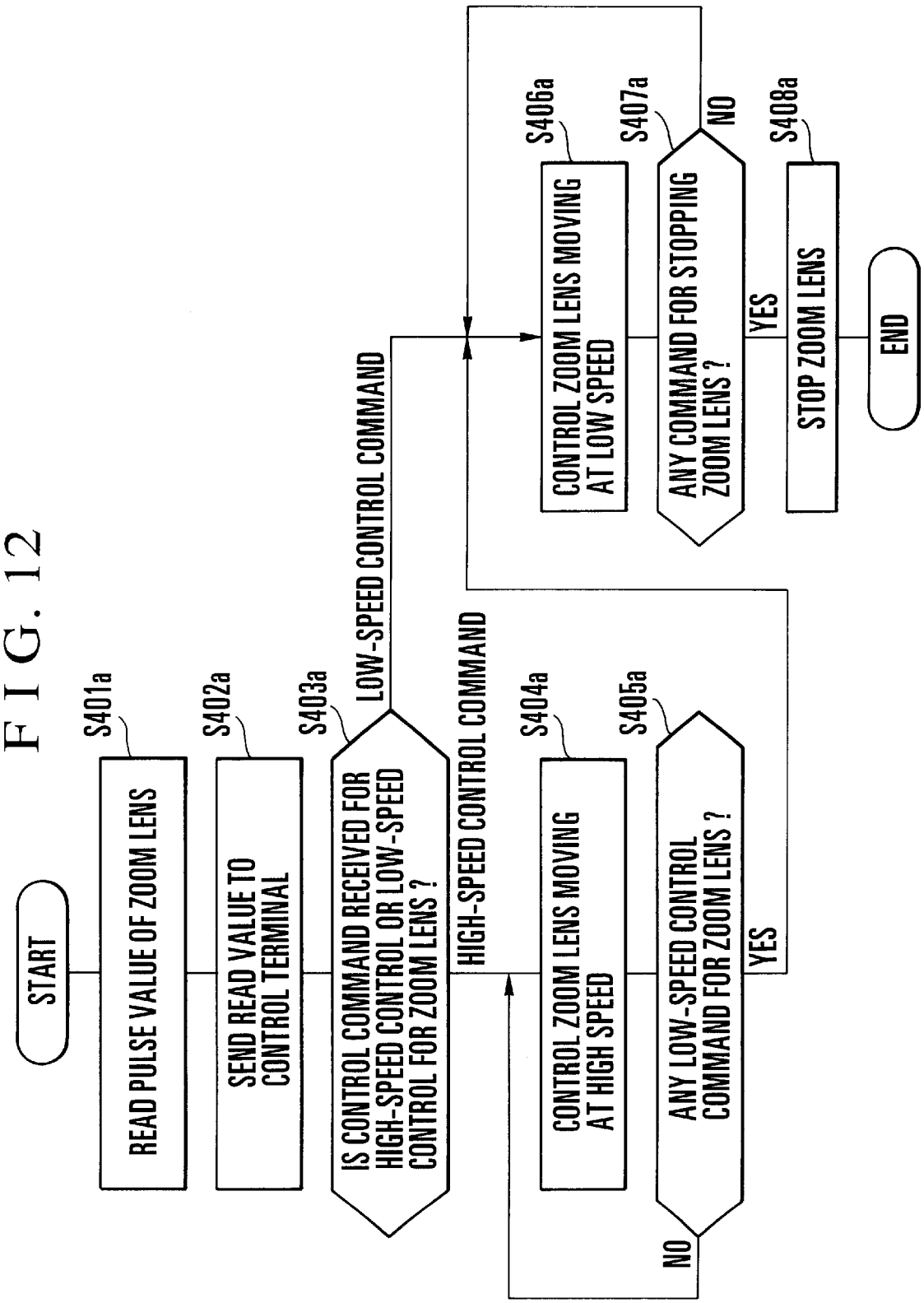
FIG. 12 is a flow chart showing the processes of operation of a camera server in the fifth embodiment.

FIG. 11 is a flow chart showing the processes of operation of the control terminal 300 in the fifth embodiment. FIG. 12 is a flow chart showing the processes of operation to be executed on the side of the camera server 100. The control operation on the zoom lens of the camera 101 in the fifth embodiment is described below with reference to these flow charts.

In the fifth embodiment, the processes to be executed by the control terminal 300 at steps S301a to S304a of FIG. 11 until the direction and the amount of moving the zoom lens are computed on the basis of a current pulse value and a target pulse value after a zoom magnification is inputted are identical with those shown at the steps S101a to S104a in FIG. 9. The processes to be executed by the camera server 100 at steps S401a and S402a of FIG. 12 are identical with those shown at the steps S201a and S202a in FIG. 10. Therefore, these parts of operation are omitted from the following description.

At a step S305a of FIG. 11, with the direction and the amount of moving the zoom lens computed by the CPU 302, a check is made to find if the computed moving amount (a pulse value or amount) is equal to or greater than a predetermined value "a", which is greater than the threshold value. If so, the position of the zoom lens is judged to be away from the target position of the zoom lens, and the flow proceeds to a step S306a. At the step S306a, the CPU 302 sends a control command to the camera server 100 to cause the zoom lens to move at a high speed.

Then, at a step S403a of FIG. 12, the CPU 201 of the camera server 100 checks the control command received from the control terminal 300 to find whether it is for moving the zoom lens at a high speed or at a low speed. Since the command is for moving the zoom lens at a high speed, in this instance, the flow of operation proceeds to a step S404a. At the step S404a, the lens control circuit 101a of the camera 101 controls and causes the zoom lens to move at a high speed.

In the fifth embodiment, the current pulse value of the zoom lens sent from the camera server 100 is arranged to be constantly read. However, when the difference between the current pulse value and the target pulse value is found at the step S305a to be less than the predetermined value "a" after the high-speed control command is sent, the flow of operation proceeds to a step S308a. At the step S308a, the CPU 302 sends a low-speed control command for the zoom lens.

The camera server 100 receives the low-speed control command at a step S405a of FIG. 12. The flow of operation then proceeds to a step S406a to cause the lens control circuit 101a to carry out the command for low-speed control over the zoom lens.

Further, at the step S305a of FIG. 11, the CPU 302 makes a check to find if the moving amount (pulse value) of the zoom lens before driving is less than the predetermined value "a". If so, the flow proceeds to the step S308a to send, to the camera server 100, a command for moving the zoom lens at a low speed. The zoom lens is then controlled and moved at the low speed at the step S406a of FIG. 12.

At a step S309a of FIG. 11, the current pulse value indicating the current position of the moving zoom lens is compared with the target pulse value, and a check is made to find if the difference thus obtained is equal to or less than the threshold value which has been described above in the description of the fourth embodiment. If the difference between the current pulse value and the target pulse value is greater than the threshold value, the moving action of the zoom lens is allowed to continue. If the difference between the current pulse value and the target pulse value is equal to or less than the threshold value, the flow proceeds to a step S310a. At the step S310a, the CPU 302 sends a command to the camera server 100 to bring the zoom lens to a stop.

At a step S407a of FIG. 12, a check is made for receipt of the command for bringing the zoom lens to a stop. When this command is received from the control terminal 300, the CPU 201 causes the lens control circuit 101a to control and stop the zoom lens from moving (step S408a).

As described above, the camera control system according to the fifth embodiment of the invention is arranged to cause the zoom lens to move at a high speed when the current position of the zoom lens is far away from the target position and at a low speed when the zoom lens comes close to the target position. According to the arrangement, therefore, the zoom lens can be more speedily and more accurately brought to the target position.

Sixth Embodiment

Figure 13:
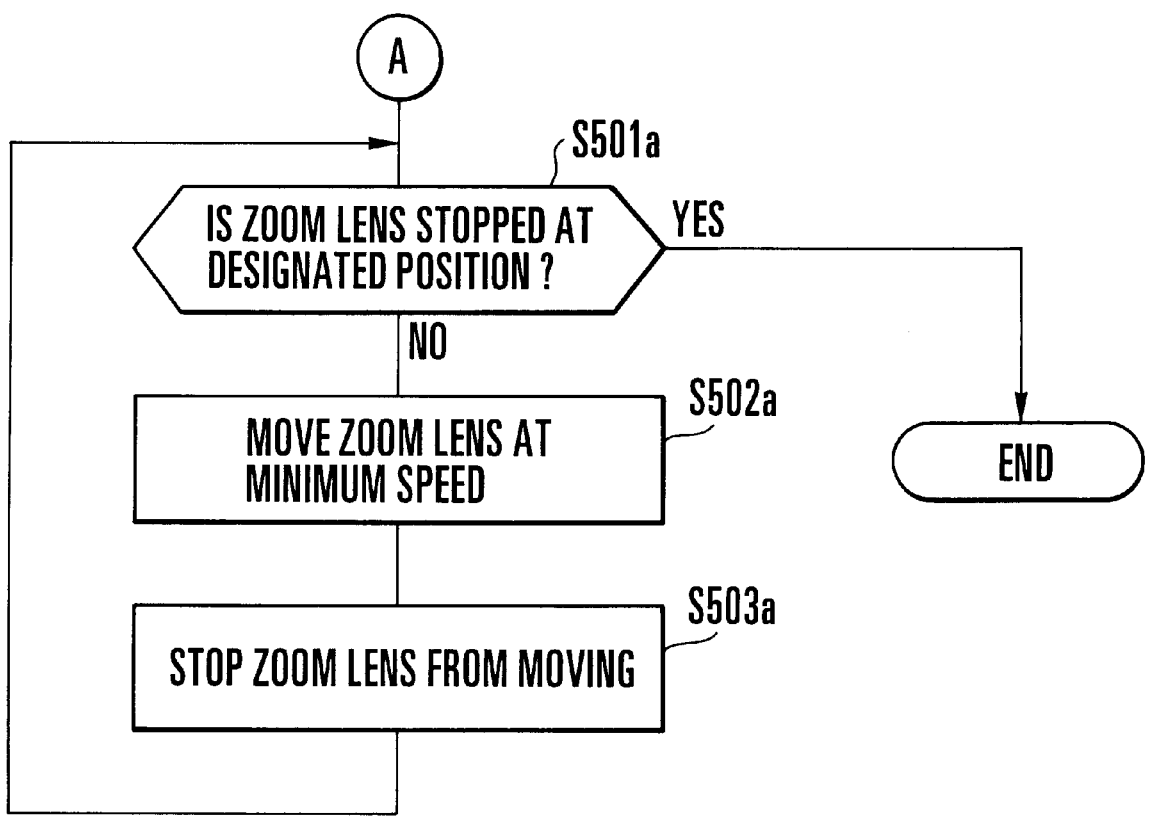
FIG. 13 is a flow chart showing the processes of operation of a control terminal in a sixth embodiment of the invention.

A sixth embodiment of the invention is arranged in the same manner as the fourth and fifth embodiments but differs in operation from these embodiments. After the processes of operation are carried out to bring the zoom lens to a stop, in the same manner as in the fourth and fifth embodiments, at a point of time A indicated in FIG. 9 or FIG. 11, the position of the zoom lens is finely adjusted. FIG. 13 is a flow chart showing a flow of processes of operation to be executed by the control terminal 300 in the sixth embodiment after the above-stated point of time A. The sixth embodiment is described below with reference to FIG. 13.

At a step S501a of FIG. 13, information on a pulse value obtained after the zoom lens is brought to a stop is received from the camera server 100, and a check is made to find if the pulse value coincides with the target value thus indicating that the zoom lens is stopped in a designated position. If so, the flow of operation comes to an end.

If the pulse value obtained after the zoom lens is brought to a stop is found to deviate from the target pulse value, the flow proceeds to a step S502a. At the step S502a, a control command is sent to the camera server 100 to cause the zoom lens to move at the minimum speed in the direction of bringing the pulse value to the target pulse value. At the next step S503a, another control command is sent to the camera server 100 to stop the zoom lens from moving after the lapse of a prescribed (very short) period of time. These steps are repeated to adjust the deviation by sending the control commands to the camera server 100 until the zoom lens reaches the target position.

In the event of a discrepancy between the pulse value obtained after the zoom lens is stopped and the target pulse value, the execution of the adjusting steps enables the sixth embodiment to accurately bring the zoom lens to a stop at the target position without fail.

Further, the objects of the invention can be attained also by providing a system or an apparatus with a storage medium in which software program codes are stored for carrying out the functions of the embodiments disclosed and by reading the program codes stored in the storage medium by means of a computer (a CPU or MPU) included in the system or the apparatus. In such a case, the functions of the embodiments disclosed can be carried out by the program codes read out from the storage medium. Then, the storage medium in which the program codes are stored can be considered to constitute the invention.

The recording medium which is thus arranged to provide the program codes can be selected from among media including, for example, a floppy disk, a hard disk, an optical memory disk, a magneto-optical disk, a CD-ROM, a CD-R, a magnetic tape, a nonvolatile memory card, a ROM, etc.

It is possible not only to carry out the functions of the embodiments disclosed by executing the program codes read out by a computer but also to carry out a part of or all of the processes of the program by means of an OS (operating system) operating on the computer according to commands of the program codes.

The functions of the embodiments disclosed also can be carried out in such a manner that, after the program codes read out from the storage medium are written into a memory included in a function expanding board inserted in the computer or a function expanding unit connected to the computer, the processes of the program are actually executed either in part or in their entirety by a CPU included in the function expanding board or the function expanding unit in accordance with commands of the program codes.

In applying the invention to the storage medium mentioned above, program codes corresponding to a flow chart or flow charts described in the foregoing must be stored in the storage medium. In short, modules indispensable to a camera control system according to the invention are stored in the storage medium.

The modules indispensable to the invention include at least a recognition module for recognizing the relation of a current position of the zoom lens to a position of the zoom lens inputted on the basis of a magnification of the zoom lens, a calculation module for calculating a length of time necessary for transmitting information at least between the camera and the control terminal (transmission time), and a forming module for forming a control command for the zoom lens on the basis of the result of processes executed by the recognition module and the calculation module. The program codes for these essential modules are stored in the storage medium mentioned above.

The invention is applicable not only to control over the zoom lens of a camera but also to commands for control over panning and tilting actions of the camera with the CPU 302 arranged to be informed of the speed of panning and that of tilting of the camera and the communication time necessary between the camera and the control terminal beforehand.

In accordance with the invention, as described in the foregoing, a camera control system, a camera control device and a control method for control over the camera control device and a storage medium storing a control program for the camera control device can be arranged to be capable of accurately obtaining a desired (target) zoom magnification even when the camera is remotely controlled for zooming.

What is claimed is:

1. A camera control device for controlling a camera having a zoom lens capable of varying a magnification thereof by varying a position thereof in an optical axis direction, said camera control device comprising:
    issuing means for issuing a designated magnification of the zoom lens;
    recognition means for recognizing a relation between a position of the zoom lens based on the designated magnification of the zoom lens issued by said issuing means and a current position of the zoom lens;
    calculating means for calculating a transmission time required for transmission of information between said camera and said camera control device; and
    forming means for forming a control command for the zoom lens on the basis of the relation recognized by said recognition means between the position of the zoom lens based on the designated magnification of the zoom lens issued by said issuing means and the current position of the zoom lens and the transmission time calculated by said calculating means.

2. A camera control device according to claim 1, further comprising transmission means for transmitting to said camera the control command for the zoom lens formed by said forming means.

3. A camera control device according to claim 1, further comprising storage means for storing the transmission time calculated by said calculating means.

4. A camera control device according to claim 1, wherein said forming means is arranged to form at least a command for driving the zoom lens and a command for stopping the driving of the zoom lens.

5. A camera control device according to claim 4, wherein the command for driving the zoom lens includes at least a command for moving the zoom lens at a high speed and a command for moving the zoom lens at a low speed, and said forming means is arranged to form one of the command for moving the zoom lens at a high speed and the command for moving the zoom lens at a low speed according to a result of recognition provided by said recognition means.

6. A camera control device according to claim 2, wherein said forming means is arranged to form a control command for moving the zoom lens for a minute period of time, if the current position of the zoom lens is found by said recognition means to differ from the position of the zoom lens based on the designated magnification of the zoom lens issued by said issuing means after a command for stopping driving of the zoom lens is transmitted by said transmission means.

7. A camera control system in which a camera connected to a camera server is controllable by a camera control device via a network,
    said camera comprising a zoom lens capable of varying a magnification thereof by varying a position thereof in an optical axis direction,
    said camera control device comprising:
        issuing means for issuing a designated magnification of the zoom lens;
        recognition means for recognizing a relation between a position of the zoom lens based on the designated magnification of the zoom lens issued by said issuing means and a current position of the zoom lens;
        calculating means for calculating a transmission time required for transmission of information between said camera and said camera control device; and
        forming means for forming a control command for the zoom lens on the basis of the relation recognized by said recognition means between the position of the zoom lens based on the designated magnification of the zoom lens issued by said issuing means and the current position of the zoom lens and the transmission time calculated by said calculating means, and
    said camera server comprising:
        detection means for detecting the current position of the zoom lens; and
        transmission means for transmitting to said camera control device information on the current position of the zoom lens detected by said detection means.

8. A camera control system according to claim 7, wherein said transmission means is arranged to further transmit to said camera control device information on the transmission time calculated by said calculating means.

9. A computer-readable storage medium storing a control program for controlling a camera control device which controls a camera having a zoom lens capable of varying a magnification thereof by varying a position thereof in an optical axis direction, said control program comprising the steps of:

issuing a designated magnification of the zoom lens;

recognizing a relation between a position of the zoom lens based on the designated magnification of the zoom lens issued and a current position of the zoom lens;

calculating a transmission time required for transmission of information between said camera and said camera control device; and forming a control command for the zoom lens on the basis of the relation between the position of the zoom lens based on the designated magnification of the zoom lens issued and the current position of the zoom lens and the transmission time calculated.

10. The storage medium according to claim 9, wherein said control program further comprises a step of transmitting to said camera the control command for the zoom lens formed by the forming step.

11. The storage medium according to claim 9, wherein said control program further comprises a step of storing the transmission time calculated by the calculating step.

12. A control method for a camera control device which controls a camera having a zoom lens capable of varying a magnification thereof by varying a position thereof in an optical axis direction, said control method comprising:

an issuing step of issuing a designated magnification of the zoom lens;

a recognition step of recognizing a relation between a position of the zoom lens based on the designated magnification of the zoom lens issued by said issuing step and a current position of the zoom lens;

a calculating step of calculating a transmission time required for transmission of information between said camera and said camera control device; and a forming step of forming a control command for the zoom lens on the basis of the relation recognized by said recognition step between the position of the zoom lens based on the designated magnification of the zoom lens issued by said issuing step and the current position of the zoom lens and the transmission time calculated by said calculating step.

13. A control method according to claim 12, further comprising a step of transmitting to said camera the control command for the zoom lens formed by said forming step.

14. A control method according to claim 12, further comprising a step of storing the transmission time calculated by said calculating step.

* * * * *